(12) United States Patent
Hutchins

(10) Patent No.: US 8,950,434 B2
(45) Date of Patent: *Feb. 10, 2015

(54) FLOW CONTROL DEVICE

(75) Inventor: Bill R. Hutchins, Warwickshire (GB)

(73) Assignee: Land Rover (GB)

(*) Notice: Subject to any disclaimer, the term of this patent is extended or adjusted under 35 U.S.C. 154(b) by 1189 days.

This patent is subject to a terminal disclaimer.

(21) Appl. No.: 12/922,121

(22) PCT Filed: Mar. 9, 2009

(86) PCT No.: PCT/IB2009/050985
§ 371 (c)(1),
(2), (4) Date: Nov. 29, 2010

(87) PCT Pub. No.: WO2009/113020
PCT Pub. Date: Sep. 17, 2009

(65) Prior Publication Data
US 2011/0061613 A1    Mar. 17, 2011

(30) Foreign Application Priority Data

Mar. 10, 2008  (GB) .................................. 0804291.3

(51) Int. Cl.
*F01P 9/00*    (2006.01)
*B01D 19/00*    (2006.01)
(Continued)

(52) U.S. Cl.
CPC ........... *B01D 19/0036* (2013.01); *F01P 11/029* (2013.01); *F16L 55/02736* (2013.01); *B01D 19/0042* (2013.01); *B01D 19/0068* (2013.01); *F01P 11/028* (2013.01)
USPC ......................................... 138/42; 123/41.01

(58) Field of Classification Search
CPC .. F01P 11/028; F01P 11/029; B01D 19/0036; B01D 19/0042; B01D 19/0068; B01D 19/0063; F16L 55/027; F16L 55/02736
USPC .......................... 138/42, 40; 123/41.01, 41.54
See application file for complete search history.

(56) References Cited

U.S. PATENT DOCUMENTS 3,586,104 A * 6/1971 Hyde ............................ 166/142
4,043,360 A * 8/1977 Yaron ............................. 138/42
(Continued)

FOREIGN PATENT DOCUMENTS

DE    19502843 A1    8/1995
DE    10041121 A1    3/2002
(Continued)

OTHER PUBLICATIONS

International Search Report from PCT/IB2009/050985 dated Jun. 9, 2009. (5 pages).
English Abstract for DE 10041121 (1 page).
English Abstract for DE 19502843 (1 page).
English Abstract for FR 2841187 (1 page).

*Primary Examiner* — J. Casimer Jacyna
(74) *Attorney, Agent, or Firm* — Rader, Fishman & Grauer PLLC

(57) ABSTRACT

A flow restrictor for use in a cooling system of an internal engine comprises a housing enclosing an elongate body, a number of alternating first and second circumferentially extending passages formed in the elongate body. Each first passage is separated from a respective adjacent second passage by a respective land and at least one transfer passage extending across each land so as to connect the first and second passages on each side of the land and provide a significant loss in fluid momentum.

11 Claims, 7 Drawing Sheets

(51) Int. Cl.
*F01P 11/02* (2006.01)
*F16L 55/027* (2006.01)

(56) References Cited

U.S. PATENT DOCUMENTS 4,064,848 A * 12/1977 Pabst et al. ................. 123/41.54
5,156,680 A * 10/1992 Orzechowski .................. 118/46
6,708,653 B2 * 3/2004 Lefrançois et al. ........ 123/41.54
8,607,746 B2 * 12/2013 Hutchins ................... 123/41.54
2007/0215073 A1 9/2007 Lawrence et al.

FOREIGN PATENT DOCUMENTS

| FR | 2841187 | A1 | | 12/2003 | |
|----|---------|----|----|---------|---|
| GB | 789670  | A  |    | 1/1958  | |
| GB | 2007831 | A  |    | 5/1979  | |
| GB | 2403163 | A  |    | 12/2004 | |
| GB | 2458264 |    | *  | 9/2009  | ............ F01P 11/029 |

* cited by examiner

FLOW CONTROL DEVICE

CROSS-REFERENCES TO RELATED APPLICATIONS

This application is a National Stage application which claims the benefit of International Application No. PTCT/IB2009/050985 filed Mar. 9, 2009, which claims priority based on Great Britain Application No.0804291.3, filed Mar. 10, 2008, both of which are hereby incorporated by reference in their entirety.

TECHNICAL FIELD

The present invention relates to a flow control device for use in a cooling system of an internal vehicle engine.

BACKGROUND

Cooling systems generally include an expansion tank having a degas conduit connected to an upper end of a radiator and a return conduit connected to a pump return conduit. It is known that the degas conduit has contradictory requirements, during initial cooling system a large volume of air needs to be transported to the expansion tank but during certain times such as engine warm-up the flow to the expansion tank from the main cooling system needs to be limited in order to speed up heating of the coolant. It is therefore common practice to use a control flow device such as a single orifice restrictor in the degas conduit to minimise these effects.

Such a conventional single orifice restrictor is relatively small (<2 mm diameter) in order to meet these conflicting flow requirements to the expansion tank and so is easily blocked by debris circulating through the cooling system. In addition, the small size of the orifice means that very high velocities are produced through the orifice (>10 m/s) and this combination of high velocity and low pressure tends to exacerbate aeration and cavitation and increase potential erosion of wall material.

SUMMARY

It is an object of the present invention to provide an improved restrictor which minimises or eliminates these problems.

According to a first aspect of the invention there is provided a flow restrictor for use in a cooling system of an internal engine comprising a housing enclosing an elongate body, a number of alternating first and second circumferentially extending passages formed in the elongate body each first passage being separated from a respective adjacent second passage by a respective land and at least one transfer passage extending across each land so as to connect the first and second passages on each side of the land and provide a significant loss in fluid momentum.

An outlet end of each transfer passage may be inclined with respect to the flow of fluid through the first and second passages with which it cooperates at an acute angle and an inlet end of each transfer passage is inclined with respect to the flow of fluid through the first and second passages with which it cooperates at an obtuse angle.

The inclination of the outlets from the transfer passages may cause fluid to flow in a first direction in the first passages and in a second opposite direction in the second passages.

The inclination of the inlets to the transfer passages may cause a significant loss of fluid momentum as the fluid is transferred from one circumferentially extending passage to the next circumferentially extending passage.

According to a second aspect of the invention there is provided a flow restrictor for use in a cooling system of an internal engine comprising a restrictor housing and a elongate plastic restrictor body fitted inside the restrictor housing, the restrictor body having a number of alternating first and second circumferentially extending passages formed therein, each first passage being separated from a respective adjacent second passage by a respective land and first and second transfer passages connecting the first and second passages on each side of the land to an internal swirl chamber used to produce a momentum loss as the coolant is transferred through the swirl chamber.

Each first transfer passage may be an inlet passage through which fluid flows from one of the circumferentially extending passages into the swirl chamber.

Each inlet passage may be arranged tangentially with respect to the swirl chamber with which it cooperates so as to generate a circulatory flow within the swirl chamber.

The second transfer passage may be an outlet passage to transfer fluid from the swirl chamber to a circumferentially extending passage.

Each swirl chamber may have a large diameter portion with which at least one inlet transfer passage cooperates and a small diameter portion with which at least one outlet transfer passage cooperates.

The flow restrictor body may include a number of swirl chambers spaced out along its length.

The restrictor body may be moulded as a single component with the restrictor housing.

The restrictor body may be connected to the restrictor housing by an integrally formed thin flexible tether.

The restrictor body may be formed of two halves joined along one edge by a flexible hinge.

The restrictor housing may be formed by an outlet port of an expansion tank.

BRIEF DESCRIPTION OF THE DRAWING

The invention will now be described by way of example with reference to the accompanying drawings of which:—

DETAILED DESCRIPTION

Figure 1:
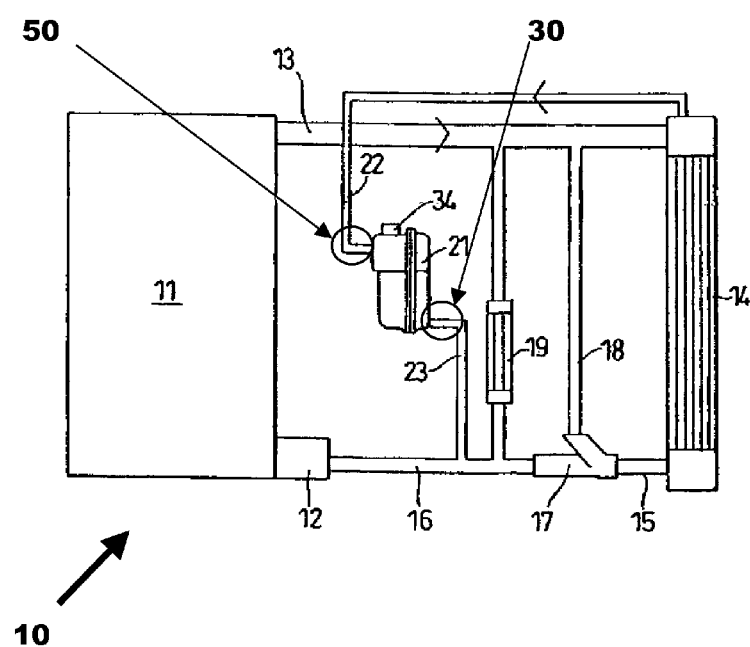
FIG. 1 is a schematic representation of a conventional cooling system for a liquid cooled internal combustion engine incorporating a flow restrictor according to the present invention.

Referring to FIG. 1, a conventional cooling system 10 for an internal combustion engine 11 has a circulation pump 12 which can deliver liquid coolant through the engine 11 to an engine delivery hose 13 and a heat exchanger in the form of a conventional air cooled radiator 14. Flow from the radiator 14 back to the circulation pump 12 passes through a radiator return hose 15, a thermostatically controlled bypass valve 17 and a pump return hose 16.

The bypass valve 17 operates to control flow in the radiator return hose 15 and in a bypass hose 18 such that until the coolant reaches higher temperatures most of the flow of coolant from the engine 11 is through the bypass hose 18 and there is no significant flow through the radiator 14. At higher coolant temperatures, most of the flow passes through the radiator 14.

An expansion tank 21 has a tank feed hose or degas conduit 22 connected at a first position to an upper end of the radiator 14 and a tank return hose or conduit 23 connected at a second position to the pump return hose 16.

A filler port is located on the top of the expansion tank 21 for use in adding coolant to the coolant system 10. The filler port is, as is well known in the art, closed off by a pressure cap 34.

Note that the first point of connection of the degas conduit 22 to the cooling circuit is located vertically higher than the second point of connection of the return conduit 23 to the cooling circuit and that the second position is a position where the pressure in the cooling system is relatively low, that is to say, the second position is a position upstream from or on an inlet side of the circulation pump 12 where the pressure in the cooling system is lowest.

A heater matrix 19 for the heating the vehicle passenger compartment is also shown connected between the engine delivery hose 13 and the pump return hose 16.

The cooling system also includes a flow control device 50 located between the expansion tank 21 and the first point of connection of the expansion tank 21 to the main cooling circuit of the cooling system.

The inventors have realised that by using momentum loss principles they can construct a restrictor with the required restriction, as mentioned in the preamble of the present invention, to flow while permitting debris of 2 to 3 mm to pass through without blockage. In addition, due to the larger flow area used in such a device, the flow velocities are reduced and many of the problems associated with the use of a single orifice restrictor can be overcome.

Preferably, the flow restrictor is in the form of a momentum loss flow restrictor in which fluid is caused to flow along a serpentine path through the restrictor thereby dissipating fluid momentum and causing a pressure drop across the restrictor. This type of restrictor has the advantage that the flow path through the restrictor can be relatively large compared to a single orifice.

Figure 2:
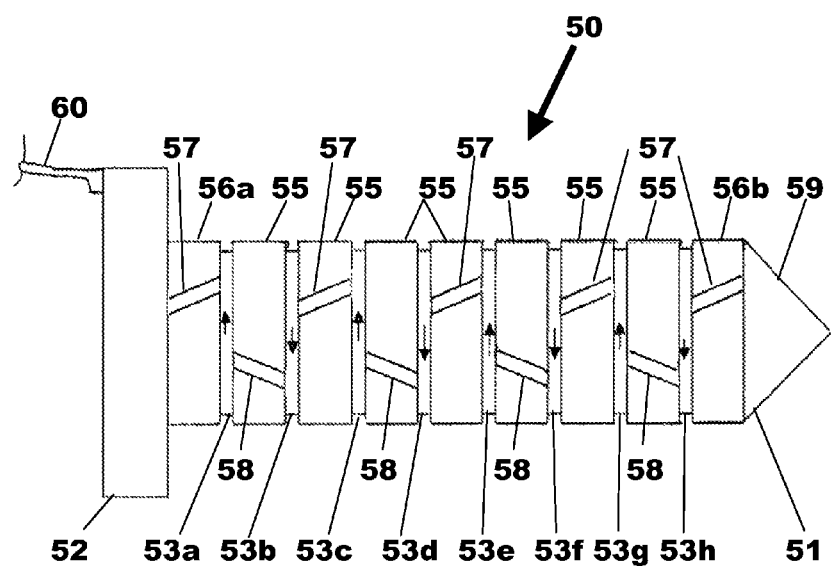
FIG. 2 is a side view of a restrictor body of a flow restrictor for use in the cooling system shown in FIG. 1.
Figure 3:
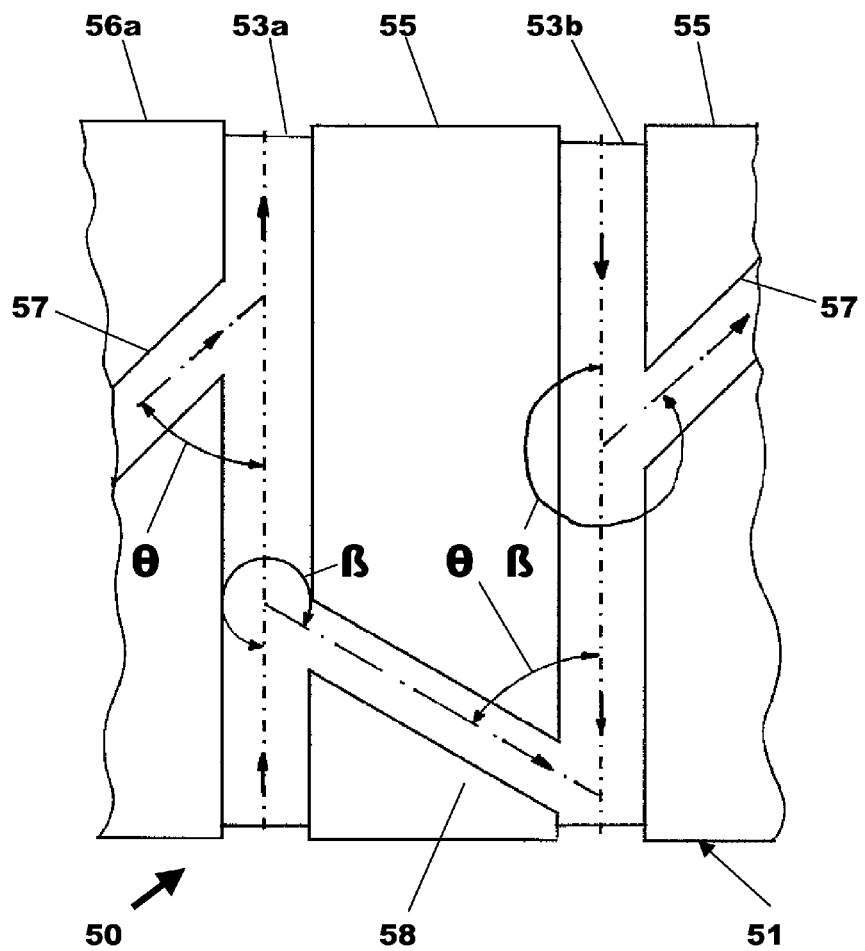
FIG. 3 is an enlarged side view of part of the restrictor body shown in FIG. 2.
Figure 4:
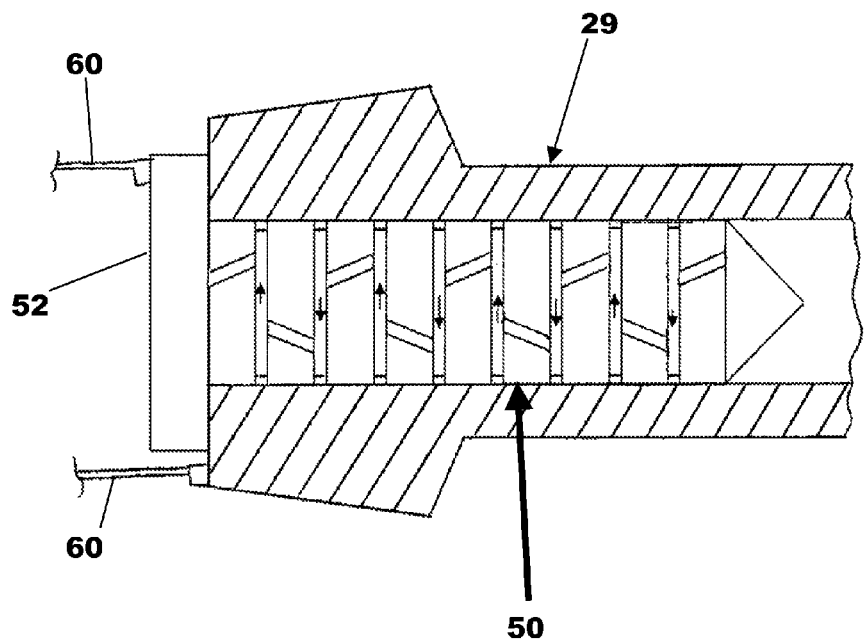
FIG. 4 is a view similar to that of FIG. 2 but showing the restrictor body located in a restrictor housing formed by an inlet port of the expansion tank.

A momentum loss flow restrictor 50, as shown in FIGS. 2 to 4, comprises a restrictor housing which in this case is formed by an inlet port 29 of the expansion tank 21 and a restrictor body 51 fitted inside the restrictor housing 29.

The restrictor body 51 is an elongate body having in this case eight alternating first and second circumferentially extending passages 53a, 53c, 53e, 53g and 53b, 53d, 53f, 53h formed therein. Each of the first passages 53a, 53c, 53e, 53g is separated from a respective adjacent second passage 53b, 53d, 53f, 53h by a respective land 55 and at least one transfer passage 57, 58 extends through each land 55 so as to connect the first and second passages 53a, 53c, 53e, 53g and 53b, 53d, 53f, 53h on each side of the land 55 and produce a momentum loss as the coolant is transferred therethrough.

At an inlet end 52 of the restrictor body 51 there is a terminal land 56a having at least one transfer passage 57. In this case each transfer passage 57 only communicates at one end with a circumferentially extending passage 53a, the other end being arranged to receive a flow of coolant from the cooling system via the degas conduit 22.

At an outlet end 59 of the restrictor body 51 there is a terminal land 56b having at least one transfer passage 57. In this case each transfer passage 57 only communicates at one end with a circumferentially extending passage 53h the other end being arranged to supply a flow of coolant to the expansion tank 21.

One set of transfer passages 57 extend in a helical fashion in one direction about the restrictor body 51 and another set of transfer passages 58 extend in a similar helical fashion in an opposite direction about the restrictor body 51 so as to produce a serpentine like flow effect.

As best viewed with reference to FIG. 3, an outlet end of each transfer passage 55 is inclined with respect to the flow of fluid through the first and second passages 53a, 53c, 53e, 53g and 53b, 53d, 53f, 53h with which it cooperates at an acute angle θ and an inlet end of each transfer passage 55 is inclined with respect to the flow of fluid through the first and second passages 53a, 53c, 53e, 53g and 53b, 53d, 53f, 53h with which it cooperates at an obtuse angle β.

The inclination of the outlets from the transfer passages 55 causes fluid to flow in a first direction in the first passages 53a, 53c, 53e, 53g and in a second opposite direction in the second passages 53b, 53d, 53f, 53h. This is because the momentum of the fluid exiting the transfer passages 55 in combination with the acute angle θ produces a circulatory effect in the passage 53a, 53b, 53c, 53d, 53e, 53f, 53g and 53h that the fluid enters.

However, the obtuse inclination of the inlets to the transfer passages 55 causes a significant loss of fluid momentum as the fluid is transferred from one circumferentially extending passage 53a, 53c, 53e, 53g and 53b, 53d, 53f, 53h to the next circumferentially extending passage 53a, 53c, 53e, 53g and 53b, 53d, 53f, 53h. This is because the fluid has to turn sharply by more than 90 degrees into the inlet of the transfer passage 55 and considerable turbulence or circulation is caused at the inner radius of the turn as the fluid tries to change direction. It will also be appreciated that this turning has the effect of acting as a mini separator and assists with the separation of gas from the coolant as it flows into the expansion tank 21. It will be appreciated that the flow of coolant through the flow restrictor 50 is driven by the pressure differential that naturally subsists between the inlet end 52 and the outlet end 59 of the flow restrictor 50 due to its location in the degas circuit.

It will be noted that the flow of coolant through the flow restrictor 50 follows a serpentine path zigzagging along the length of the restrictor body 51 from one circumferentially extending passage 53a, 53c, 53e, 53g to the next circumferentially extending passage 53b, 53d, 53f, 53h. Although not shown it will also be appreciated that the entry to each transfer passage 57, 58 can be in three dimensions so that, not only does the coolant need to turn sharply as indicated, it also has to move towards or away from a central axis of the restrictor body 51. This could be achieved by using transfer passages 57, 58 and first and second circumferentially extending passages 53a, 53c, 53e, 53g and 53b, 53d, 53f, 53h of varying depth.

Advantageously, the flow restrictor 50 is made from the same plastic material as the expansion tank 21 so that any expansion or contraction of the expansion tank 21 is replicated by the restrictor body 51 and so as to permit the restrictor body 52 to be moulded as a single component with the expansion tank 21.

Preferably, the restrictor body 51 is connected to the inlet port 29 of the expansion tank 21 by an integrally formed thin flexible tether 60 so that the restrictor body 51 cannot be lost in transit and to reduce the risk of a failure to fit the restrictor body 51 into the inlet port 29 upon assembly of the cooling system.

Figure 5:
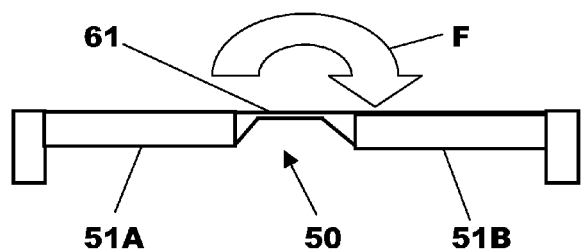
FIG. 5 is a side view of a flow restrictor body made from two parts that are hingedly joined together.
Figure 6:
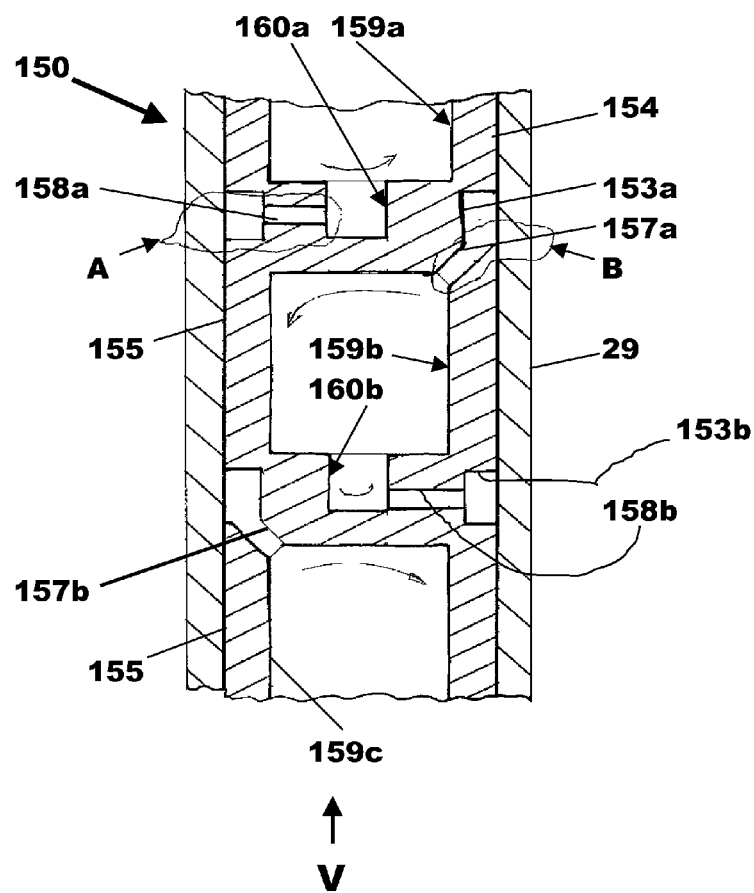
FIG. 6 is a sectional view along the split line S-S shown on FIG. 10 of part of a restrictor body according to a fourth aspect of the invention.
Figure 7:
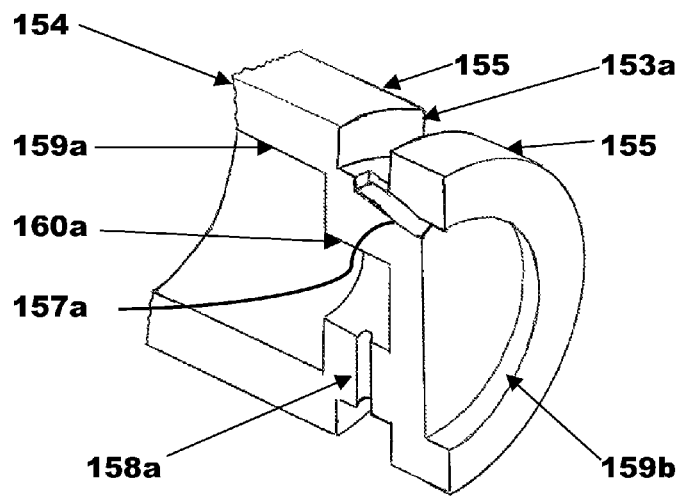
FIG. 7 is a pictorial view of part of the restrictor body shown in FIG. 6.

FIG. 5 shows a restrictor body that is intended to be a direct replacement for the restrictor body 51 described above but which is made as two halves 51A, 51B joined by a flexible link 61. When the two halves are folded together as indicated by the arrow F they form a restrictor body that can be simply inserted into the inlet port 29 in the same manner as that described above. It will be appreciated that one of the two halves 51A, 51B could also have a flexible tether moulded as part of it to connect the restrictor to the expansion tank 21. One advantage of such a construction is that it allows more complex passage shapes and paths to be moulded.

With reference to FIGS. 6 to 11 there is shown an alternative of a flow restrictor 150 according to the invention which is intended as a direct replacement for the flow restrictor 50 previously described.

The flow restrictor 150 comprises a restrictor housing formed in this case by the inlet port 29 of the expansion tank 21 and a elongate plastic restrictor body 154 fitted inside the restrictor housing 29.

The restrictor body 154 has formed therein a number of alternating first and second circumferentially extending passages of which two passages 153a and 153b are shown.

Each first passage 153a is separated from a respective adjacent second passage 153b by a respective land 155 and first and second transfer passages 157a and 158b connect the first and second passages 153a and 153b on each side of the land 155 to an internal swirl chamber used to produce a momentum loss as the coolant is transferred through the swirl chamber. Each swirl chamber has a large diameter portion 159a, 159b, 159c with which at least one first transfer passage 157a, 157b cooperates and a small diameter portion 160a, 160b with which at least one second transfer passage 158a, 158b cooperates.

Figure 8:
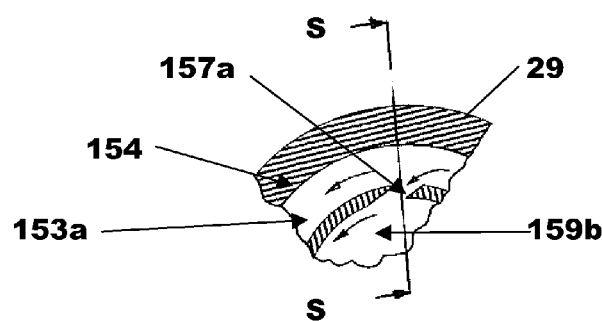
FIG. 8 is a scrap cross section in the region of area B on FIG. 6 showing an inlet passage and the location of the split line S-S.
Figure 9:
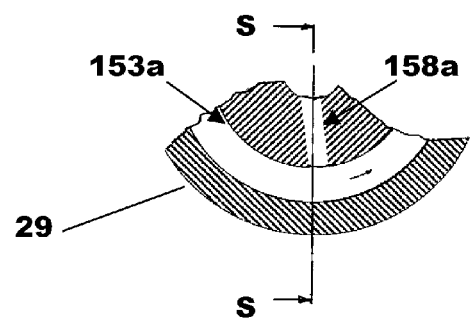
FIG. 9 is a scrap cross section in the region of area A on FIG. 6 showing an outlet passage and the location of the split line S-S.

Each first transfer passage is an inlet passage 157a, 157b through which fluid flows from one of the circumferentially extending passages 153a, 153b into the swirl chamber and each inlet passage 157a, 157b is arranged tangentially with respect to the swirl chamber with which it cooperates so as to generate a circulatory flow within the swirl chamber (see FIG. 8).

Each second transfer passage is an outlet passage 158a, 158b to transfer fluid from the swirl chamber to a circumferentially extending passage 153a, 153b.

It will be appreciated that the restrictor body 154 has a number of swirl chambers spaced out along its length and that fluid flows sequentially through the swirl chambers from one end of the restrictor 150 to an opposite end located closest to the expansion tank.

Preferably, the restrictor body 154 is made from the same plastic material as the expansion tank 21 so that the restrictor body 154 can be moulded as a single component with the expansion tank 21. In addition, it is desirable for the restrictor body 154 to be connected to the outlet port 29 by an integrally formed thin flexible tether (not shown).

Figure 10:
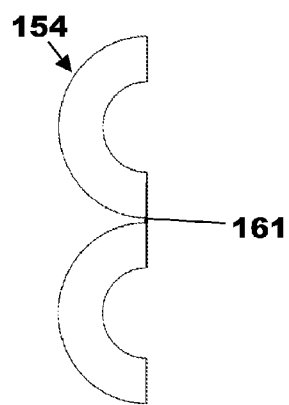
FIG. 10 is an end view of the restrictor body in a manufactured or open state.
Figure 11:
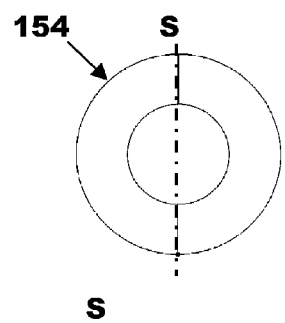
FIG. 11 is an end view showing the restrictor body in a closed or in use state.

In order to permit the complex internal shapes of the swirl chamber and the inlet and outlet transfer passages to be simply produced, the restrictor body 154 as shown in FIGS. 10 and 11 is formed of two halves joined along one edge by a flexible hinge 161. The two halves are folded together to form the completed restrictor body 154.

In operation fluid enter each swirl chamber through one of the inlet passages 157a, 157b where due to the high velocity with which the fluid enters and the tangential arrangement of the inlet passages a rotating or vortex flow is formed within the large diameter portion 159a, 159b, 159c of the swirl chamber. The effect of this circulatory flow that it encourages the much denser liquid to be thrown outwardly against the wall of the large diameter portion 159a, 159b, 159c while the lighter gas within the fluid passes with little restriction through the middle or centre of the swirl chamber. The drag created when the heavier liquid impinges against the wall of the swirl chamber reduces the momentum of the liquid as the liquid has to rotate several times before it can reach the outlet passage 158a, 158b from the swirl chamber. In addition, in order for the liquid to reach the outlet passage 158a, 158b it has to climb the step formed due to the difference in diameter of the large and small diameter portions 159a, 159b, 159c and 160a, 160b of the swirl chamber and so further energy is dissipated.

All of the passages within this type of flow restrictor 150 can be large relative to a single orifice thereby reducing the risk of blockage due to debris.

As shown, the arrangement of the inlet passages 157a, 157b is such that the fluid circulates in opposite direction in adjacent swirl chambers but this need not be the case. Similarly the arrangement of the outlet passages 158a, 158b is such that alternating anticlockwise and clockwise rotation of the fluid is produced in the first and second circumferentially extending passages 153a and 153b when viewed in the direction of arrow V on FIG. 6.

The invention claimed is:

1. A flow restrictor for use in a cooling system of an internal engine comprising a restrictor housing and an elongate plastic restrictor body fitted inside the restrictor housing, the restrictor body having a number of alternating first and second circumferentially extending passages formed therein, each first passage being separated from a respective adjacent second passage by a respective land and first and second transfer passages connecting the first and second passages on each side of the land to an internal swirl chamber used to produce a momentum loss as the coolant is transferred through the swirl chamber.

2. A flow restrictor as claimed in claim 1 wherein each first transfer passage is an inlet passage through which fluid flows from one of the circumferentially extending passages into the swirl chamber.

3. A flow restrictor as claimed in claim 2 wherein each inlet passage is arranged tangentially with respect to the swirl chamber with which it cooperates so as to generate a circulatory flow within the swirl chamber.

4. A flow restrictor as claimed in claims 1 wherein the second transfer passage is an outlet passage to transfer fluid from the swirl chamber to a circumferentially extending passage.

5. A flow restrictor as claimed in claim 2 wherein the second transfer passage is an outlet passage to transfer fluid from the swirl chamber to a circumferentially extending passage and wherein each swirl chamber has a large diameter portion with which at least one inlet transfer passage cooperates and a small diameter portion with which at least one outlet transfer passage cooperates.

6. A flow restrictor as claimed in claim 1 wherein the flow restrictor body includes a number of swirl chambers spaced out along its length.

7. A flow restrictor as claimed in claim 2 wherein the second transfer passage is an outlet passage to transfer fluid from the swirl chamber to a circumferentially extending passage.

8. A flow restrictor as claimed in claim 3 wherein the second transfer passage is an outlet passage to transfer fluid from the swirl chamber to a circumferentially extending passage.

9. A flow restrictor as claimed in claim 3 wherein the second transfer passage is an outlet passage to transfer fluid from the swirl chamber to a circumferentially extending passage and wherein each swirl chamber has a large diameter portion with which at least one inlet transfer passage cooperates and a small diameter portion with which at least one outlet transfer passage cooperates.

10. A flow restrictor as claimed in claim 2 wherein the flow restrictor body is a single piece body and includes a number of swirl chambers spaced out along its length.

11. A flow restrictor as claimed in claim 1 wherein the restrictor body includes a pair of half portions joined along one edge by a flexible hinge.

\* \* \* \* \*